United States Patent
Gormley

(10) Patent No.: US 12,529,348 B1
(45) Date of Patent: Jan. 20, 2026

(54) LINKAGE DAMPER FOR AIRCRAFT COMPONENT

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/774,271

(22) Filed: Jul. 16, 2024

(51) Int. Cl.
*F02K 1/72* (2006.01)
*F02K 1/76* (2006.01)
*F02K 1/60* (2006.01)
*F02K 1/62* (2006.01)

(52) U.S. Cl.
CPC .............. *F02K 1/766* (2013.01); *F02K 1/72* (2013.01); *F02K 1/605* (2013.01); *F02K 1/625* (2013.01); *F02K 1/763* (2013.01); *F05D 2260/96* (2013.01)

(58) Field of Classification Search
CPC . F02K 1/766; F02K 1/72; F02K 1/605; F02K 1/625; F02K 1/763; F05D 2260/96
See application file for complete search history.

(56) References Cited

U.S. PATENT DOCUMENTS

| | | | | |
|---|---|---|---|---|
| 4,564,160 A * | 1/1986 | Vermilye | ............... | F02K 1/76 239/265.29 |
| 4,605,186 A | 8/1986 | Fernz | | |
| 5,806,302 A * | 9/1998 | Cariola | ............... | F02K 1/09 239/265.29 |
| 6,170,254 B1 * | 1/2001 | Cariola | ............... | F02K 1/72 244/110 B |
| 8,876,018 B2 * | 11/2014 | Vauchel | ............... | F02K 1/62 239/265.33 |
| 10,024,270 B2 | 7/2018 | Kelford | | |
| 2015/0068190 A1 * | 3/2015 | Roger | ............... | F01D 17/141 60/226.2 |
| 2015/0204272 A1 * | 7/2015 | James | ............... | F02K 1/72 239/265.19 |
| 2015/0267641 A1 * | 9/2015 | Gormley | ............... | F02K 1/766 239/265.19 |
| 2016/0326985 A1 * | 11/2016 | Hercock | ............... | F02K 1/625 |
| 2017/0306853 A1 * | 10/2017 | Suciu | ............... | F02K 3/06 |

(Continued)

OTHER PUBLICATIONS

"Seals-it Rod End Seals WS37506PK", https://www.summitracing.com/parts/sit-ws37506pk, May 29, 2024.

*Primary Examiner* — Gerald L Sung
*Assistant Examiner* — Rene D Ford
(74) *Attorney, Agent, or Firm* — Getz Balich LLC

(57) ABSTRACT

A thrust reverser for an aircraft propulsion system includes a passage, a blocker door, an actuation linkage and a damper. The thrust reverser is configured to move the blocker door from a stowed position to a deployed position using the actuation linkage. The blocker door is located radially outboard of a flowpath relative to an axis when the blocker door is in the stowed position. The blocker door is configured to redirect air flowing in the flowpath radially outward through the passage when the blocker door is in the deployed position. The actuation linkage is pivotally coupled to the blocker door at a longitudinal distal end of the actuation linkage. The damper is disposed at the longitudinal distal end of the actuation linkage. The damper is configured to engage the actuation linkage and damp vibrations in the actuation linkage. The damper is configured from or otherwise includes elastomeric material.

13 Claims, 9 Drawing Sheets

(56) References Cited

U.S. PATENT DOCUMENTS

| | | | |
|---|---|---|---|
| 2020/0003155 A1* | 1/2020 | Kelford | F02K 1/72 |
| 2020/0095955 A1* | 3/2020 | Davis | B29C 43/36 |
| 2021/0108594 A1* | 4/2021 | Song | F02K 1/766 |
| 2023/0059782 A1 | 2/2023 | Cazuc | |
| 2024/0301843 A1* | 9/2024 | Gormley | F02K 1/72 |

* cited by examiner

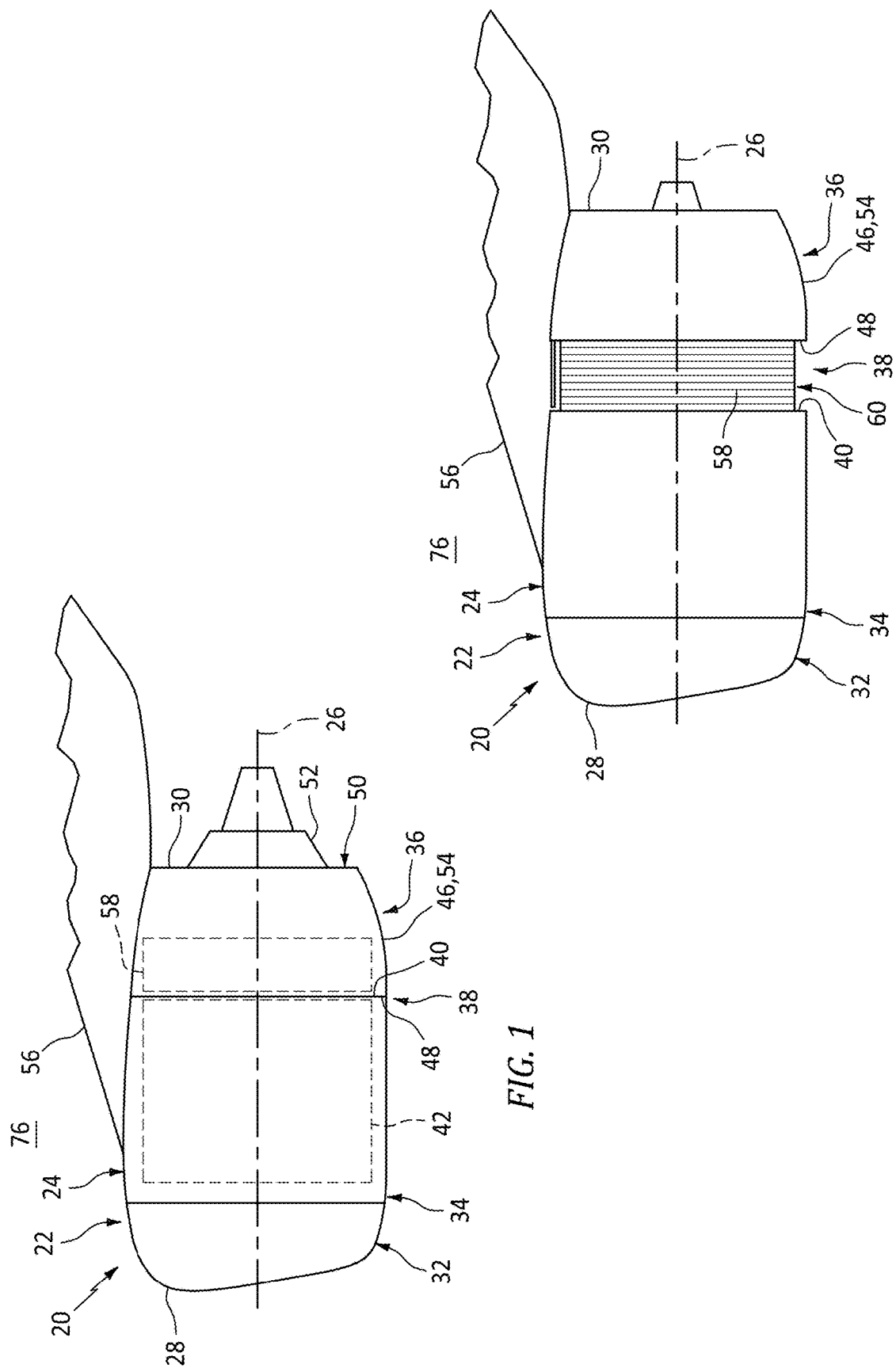

LINKAGE DAMPER FOR AIRCRAFT COMPONENT

BACKGROUND

1. Technical Field

This disclosure relates generally to an aircraft and, more particularly, to a linkage for the aircraft such as a thrust reverser draglink.

2. Background Information

An aircraft includes various linkages such as draglinks for a thrust reverser. Various types and configurations of aircraft linkages are known in the art. While these known aircraft linkages have various benefits, there is still room in the art for improvement.

SUMMARY OF THE DISCLOSURE

According to an aspect of the present disclosure, an apparatus is provided for an aircraft propulsion system. This apparatus includes a thrust reverser. The thrust reverser includes a passage, a blocker door, an actuation linkage and a damper. The thrust reverser is configured to move the blocker door from a stowed position to a deployed position using the actuation linkage. The blocker door is located radially outboard of a flowpath relative to an axis when the blocker door is in the stowed position. The blocker door is configured to redirect air flowing in the flowpath radially outward through the passage when the blocker door is in the deployed position. The actuation linkage is pivotally coupled to the blocker door at a longitudinal distal end of the actuation linkage. The damper is disposed at the longitudinal distal end of the actuation linkage. The damper is configured to engage the actuation linkage and damp vibrations in the actuation linkage. The damper is configured from or otherwise includes elastomeric material.

According to another aspect of the present disclosure, another apparatus is provided for an aircraft propulsion system. This apparatus includes a stationary structure, a sleeve, a blocker door, an actuation linkage and a damper. The sleeve is configured to translate axially along an axis relative to the stationary structure. The blocker door is pivotally coupled to the sleeve. The blocker door is configured to move from a stowed position to a deployed position. The actuation linkage is pivotally coupled to the stationary structure at a distal first end of the actuation linkage. The actuation linkage is pivotally coupled to the blocker door at a distal second end of the actuation linkage. The damper is configured to engage the actuation linkage and damp vibrations in the actuation linkage when the blocker door is in the stowed position. The damper is disengaged from the actuation linkage when the blocker door is in the deployed position.

According to still another aspect of the present disclosure, an apparatus is provided for an aircraft. This apparatus includes a link, a spherical bearing, a damper and a fastener. The link extends longitudinally from a first end of the link to a second end of the link. The link includes a receptacle at the first end of the link. The spherical bearing is disposed within the receptacle. The spherical bearing includes a race element and a ball element. The race element circumscribes the ball element and radially engages the link. The damper includes an inner ring, an outer ring and an intermediate ring connecting the inner ring to the outer ring. The inner ring is abutted against the ball element. The outer ring is abutted the link. The intermediate ring is configured from or otherwise includes elastomeric material. The fastener projects through the spherical bearing and the damper.

The damper may be a first damper disposed to a first side of the link. The apparatus may also include a second damper disposed to a second side of the link opposing the first side of the link. The fastener may also project through the second damper.

The apparatus may also include a thrust reverser blocker door. The fastener may mount the spherical bearing to the thrust reverser blocker door.

The damper may be mounted to the sleeve.

The damper may be formed from elastomeric material.

The sleeve may circumscribe the stationary structure.

The damper may be configured to engage the actuation linkage and damp the vibrations in the actuation linkage when the blocker door is in the stowed position.

The damper may also be configured to engage the actuation linkage and damp the vibrations in the actuation linkage when the blocker door is in the deployed position.

The damper may be disengaged from the actuation linkage when the blocker door is in the deployed position.

The elastomeric material may contact the actuation linkage.

The elastomeric material may engage the actuation linkage through an intermediate member.

The actuation linkage may extend laterally between opposing linkage sides at the longitudinal distal end of the actuation linkage. The damper may be configured to laterally engage a first of the opposing linkage sides at least when the blocker door is in the stowed position.

The damper may also be configured to laterally engage a second of the opposing linkage sides at least when the blocker door is in the stowed position.

The actuation linkage may be configured to move into a slot in the damper as the blocker door moves into the stowed position.

The thrust reverser may also include a translating sleeve configured translate along the axis. The blocker door may be pivotally coupled to the translating sleeve. The damper may be fixed to the translating sleeve.

The blocker door may include a door panel and a flexible mounting device fixed to the door panel. The flexible mounting device may be discrete from the damper. The actuation linkage may be pivotally coupled to the flexible mounting device at the longitudinal distal end of the actuation linkage.

The actuation linkage may be pivotally coupled to the blocker door at a pivot axis. The damper may circumscribe the pivot axis.

The actuation linkage may be pivotally coupled to the blocker door through a spherical bearing. The damper may also include a stiff inner body, a stiff outer body and a flexible intermediate body comprising the elastomeric material. The stiff inner body may be abutted against the spherical bearing. The stiff outer body may be abutted against the actuation linkage. The flexible intermediate may connect the stiff inner body to the stiff outer body.

The stiff inner body may be a metal inner washer. In addition or alternatively, the stiff outer body may be a metal outer washer.

The apparatus may also include a stationary structure. A second longitudinal distal end of the actuation linkage may be pivotally coupled to the stationary structure.

The stationary structure may be radially inboard of the flowpath relative to the axis.

The actuation linkage may be/only include a single link.

The actuation linkage may extend radially inward from the longitudinal distal end of the actuation linkage across the flowpath when the blocker door is in the stowed position.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1 is a schematic illustration of an aircraft propulsion system with a thrust reverser in a stowed position.

FIG. 2 is a schematic illustration of the aircraft propulsion system with the thrust reverser in a deployed position.

DETAILED DESCRIPTION

Figure 3:
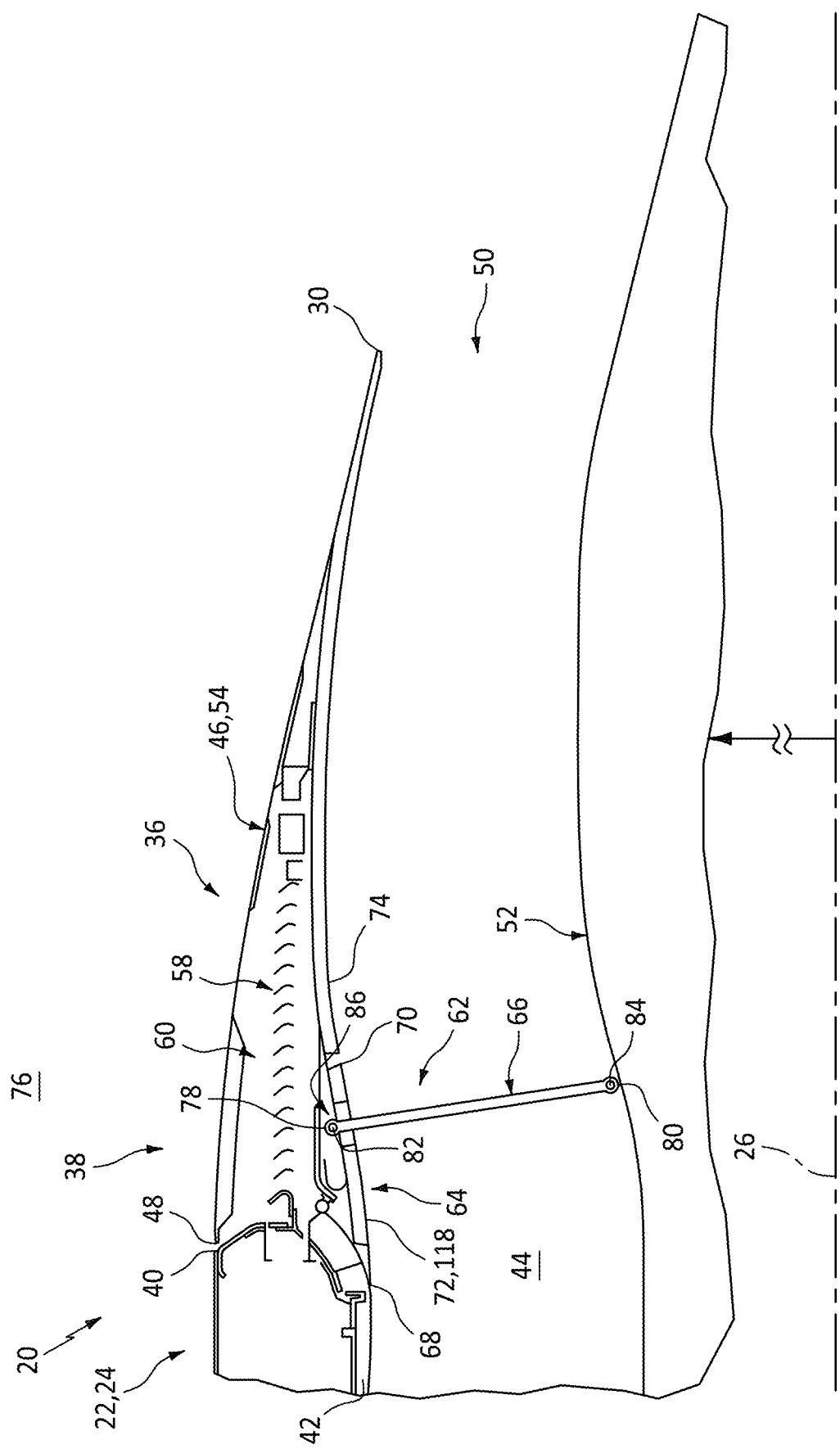
FIG. 3 is a partial schematic illustration of the aircraft propulsion system with its thrust reverser in a stowed arrangement.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 includes a gas turbine engine and a nacelle 22.

The gas turbine engine is configured to power operation of the aircraft propulsion system 20. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the aircraft propulsion system 20 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

The nacelle 22 is configured to house and provide an aerodynamic cover for the gas turbine engine. An outer structure 24 of the nacelle 22 (e.g., an outer fixed structure (OFS)) extends along an axis 26 from a forward end 28 of the nacelle 22 and its outer structure 24 to an aft end 30 of the nacelle outer structure 24. Briefly, the axis 26 may be a centerline axis of the nacelle 22 and/or one or more of its members such as the nacelle outer structure 24. The axis 26 may also or alternatively be a centerline axis of the gas turbine engine. The nacelle outer structure 24 of FIG. 1 includes an inlet structure 32, one or more fan cowls 34 (one such fan cowl visible in FIG. 1) and an aft structure 36, which aft structure 36 is configured as part of or otherwise includes a thrust reverser 38 (see also FIG. 2).

The inlet structure 32 is disposed at the nacelle forward end 28. The inlet structure 32 is configured to direct a stream of air through an inlet opening at the nacelle forward end 28 and into a fan section of the gas turbine engine.

The fan cowls 34 are disposed axially between the inlet structure 32 and the aft structure 36. Each fan cowl 34 of FIG. 1, for example, is disposed at (e.g., on, adjacent or proximate) an aft end 40 of a stationary portion of the nacelle 22, and extends axially forward to the inlet structure 32. Each fan cowl 34 is generally axially aligned with the fan section of the gas turbine engine. The fan cowls 34 are configured to provide an aerodynamic covering over a fan case 42 for the fan section. Briefly, this fan case 42 circumscribes a fan rotor in the fan section and may partially form a forward outer peripheral boundary of a bypass flowpath 44 (see FIG. 3) of the aircraft propulsion system 20.

The term "stationary portion" is used above to describe a portion of the nacelle 22 that is stationary during aircraft propulsion system operation (e.g., during takeoff, aircraft flight and landing). However, the stationary portion may be otherwise movable for aircraft propulsion system inspection/maintenance; e.g., when the aircraft propulsion system 20 is non-operational. Each of the fan cowls 34, for example, may be configured to provide access to components of the gas turbine engine such as the fan case 42 and/or peripheral equipment configured therewith for inspection, maintenance and/or otherwise. In particular, each fan cowl 34 may be pivotally mounted with the aircraft propulsion system 20 by, for example, a pivoting hinge system. Alternatively, the fan cowls 34 and the inlet structure 32 may be configured into a single axially translatable body for example. The present disclosure, of course, is not limited to the foregoing fan cowl configurations and/or access schemes.

The aft structure 36 includes a translating sleeve 46 for the thrust reverser 38. The translating sleeve 46 of FIG. 1 is disposed at the outer structure aft end 30. This translating sleeve 46 extends axially along the axis 26 between a forward end 48 of the translating sleeve 46 and the outer structure aft end 30. The translating sleeve 46 is configured to partially form an aft outer peripheral boundary of the bypass flowpath 44 (see FIGS. 3 and 4). The translating sleeve 46 may also be configured to form a bypass nozzle 50 for the bypass flowpath 44 with an inner structure 52 of the nacelle 22 (e.g., an inner fixed structure (IFS)), which nacelle inner structure 52 houses a core (e.g., a gas generator) of the gas turbine engine.

The translating sleeve 46 of FIG. 1 includes a pair of sleeve segments 54 (e.g., halves) arranged on opposing sides of the aircraft propulsion system 20 (one such sleeve segment visible in FIG. 1). The present disclosure, however, is not limited to such an exemplary translating sleeve configuration. For example, the translating sleeve 46 may alternatively have a substantially tubular body. For example, the translating sleeve 46 may extend more than three-hundred and thirty degrees (330°) around the axis 26.

Referring to FIGS. 1 and 2, the translating sleeve 46 is an axially translatable structure. Each translating sleeve segment 54, for example, may be slidably connected to one or more stationary structures (e.g., a pylon 56 and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 46 may translate axially along the axis 26 and relative to the stationary portion and the nacelle inner structure 52. The translating sleeve 46 may thereby move axially along the axis 26 between a forward stowed position (e.g., see FIG. 1) and an aft deployed position (e.g., see FIG. 2). In the sleeve stowed position of FIG. 1, the translating sleeve 46 provides the functionality described above. In the sleeve deployed position of FIG. 2, the translating sleeve 46 at least partially (or substantially completely) uncovers at least one or more components of the thrust reverser 38 such as, but not limited to, a fixed cascade structure 58 disposed in a thrust reverser passage 60. In addition, as the translating sleeve 46 moves from the sleeve stowed position to the sleeve deployed position, one or more components of the thrust reverser 38 such as, but not limited to, one or more blocker door assemblies 62 may be deployed from their stowed position (e.g., see FIG. 3) to their deployed position (e.g., see FIG. 4) to divert bypass air from the bypass flowpath 44 and through the cascade structure 58 to provide reverse thrust.

The blocker door assemblies 62 may be arranged circumferentially about the axis 26 in one or more arcuate arrays; e.g., where the bypass flowpath 44 has a D-duct configuration. Alternatively, the blocker door assemblies 62 may be arranged circumferentially about the axis 26 in a substantially annular array; e.g., where the bypass flowpath 44 has an O-duct configuration. Each blocker door assembly 62 may be configured as an exposed drag link type door assembly. Each blocker door assembly 62 of FIGS. 3 and 4, for example, includes a blocker door 64 and a door actuation linkage 66. Briefly, the door actuation linkage 66 is configured to actuate pivoting and/or other movement of the blocker door 64 between and to its stowed position of FIG. 3 and its deployed position of FIG. 4.

The blocker door 64 extends longitudinally between and to a first end 68 of the blocker door 64 and a second end 70 of the blocker door 64. This blocker door 64 is pivotally coupled to the translating sleeve 46 at or near the door first end 68. With this arrangement, the blocker door 64 is configured to pivot and/or otherwise move between its stowed position of FIG. 3 and its deployed position of FIG. 4.

When the blocker door 64 is in its stowed position of FIG. 3, the door first end 68 is a forward, upstream end of the blocker door 64 and the door second end 70 is an aft, downstream end of the blocker door 64. Here, the blocker door 64 is disposed outside of (e.g., next to and radially outboard of) the bypass flowpath 44. A side surface 72 of the blocker door 64 of FIG. 3, for example, forms a radial outer peripheral boundary of a respective portion of the bypass flowpath 44. This door side surface 72 may also be arranged flush with a radial inner surface 74 of the translating sleeve 46 and a respective one of its translating sleeve segments 54.

Figure 4:
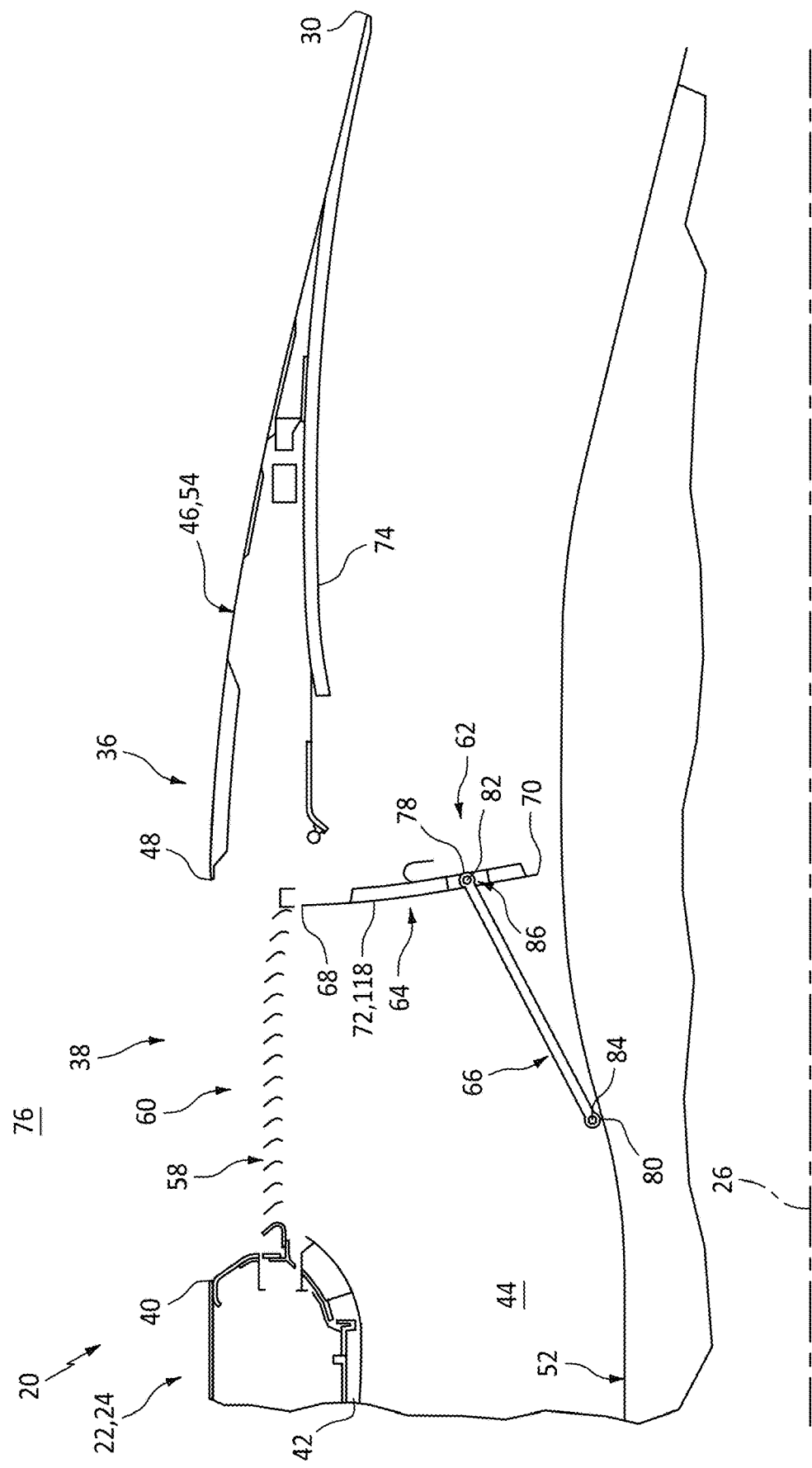
FIG. 4 is a partial schematic illustration of the aircraft propulsion system with its thrust reverser in a deployed arrangement.

When the blocker door 64 is in its deployed position of FIG. 4, the door first end 68 is a radial outer end of the blocker door 64 and the door second end 70 is a radial inner end of the blocker door 64. Here, the blocker door 64 is disposed in the bypass flowpath 44. The blocker door 64 of FIG. 4, for example, projects radially inward (e.g., towards the axis 26) into and substantially across the bypass flowpath 44. With this arrangement, the blocker door 64 and its side surface 72 are configured to block off a downstream portion of the bypass flowpath 44 and redirect air flowing in an upstream portion of the bypass flowpath 44 radially outward. Briefly, the downstream portion of the bypass flowpath 44 is a portion of the bypass flowpath 44 downstream of the deployed blocker door 64, and the upstream portion of the bypass flowpath 44 is a portion of the bypass flowpath 44 upstream of the deployed blocker door 64. The air redirected by the blocker door 64 flows radially outward (e.g., away from the axis 26) through the cascade structure 58 and the respective thrust reverser passage 60 into an environment 76 external to the aircraft propulsion system 20. The cascade structure 58 may further redirect the air flowing therethrough such that the air directed into the external environment 76 by the thrust reverser 38 follows a trajectory with an axial forward component to provide reverse thrust.

The door actuation linkage 66 of FIGS. 3 and 4 is configured as a single draglink. The door actuation linkage 66 of FIGS. 3 and 4, for example, extends longitudinally from a first end 78 of the door actuation linkage 66 to a second end 80 of the door actuation linkage 66. The door actuation linkage 66 is pivotally and/or otherwise movably coupled to the blocker door 64 at the linkage first end 78, and at an intermediate location between the first door first end 68 and the door second end 70. Here, an outer pivot axis 82 at the coupling between the door actuation linkage 66 and the blocker door 64 is a moveable pivot axis in that the location of the outer pivot axis 82 moves as the blocker door 64 moves between its stowed position of FIG. 3 and its deployed position of FIG. 4. The door actuation linkage 66 is pivotally and/or otherwise movably coupled to the nacelle inner structure 52 at the linkage second end 80. Here, an inner pivot axis 84 at the coupling between the door actuation linkage 66 and the nacelle inner structure 52 is a stationary pivot axis in that the location of the inner pivot axis 84 does not move as the blocker door 64 moves between its stowed position of FIG. 3 and its deployed position of FIG. 4. With this arrangement, the door actuation linkage 66 extends radially across the bypass flowpath 44 when the blocker door 64 is in its stowed position.

During operation of the thrust reverser 38, the door actuation linkage 66 operatively links the translating movement of the translating sleeve 46 to the pivoting movement of the blocker door 64. For example, as the translating sleeve 46 translates axially aft from its stowed position of FIG. 3 to its deployed position of FIG. 4, the translating sleeve 46 pulls the outer pivot axis 82 axially aft. However, since the inner pivot axis 84 is stationary, the door actuation linkage 66 pulls the blocker door 64 and its door second end 70 radially inward into the bypass flowpath 44. This motion may then be reversed when the translating sleeve 46 translates axially forward from its deployed position of FIG. 4 to its stowed position of FIG. 3.

Referring to FIG. 3, when the thrust reverser 38 is stowed, the bypass air flows longitudinally through the bypass flowpath 44 and along the stowed blocker door assemblies 62 to the bypass nozzle 50. Within the bypass flowpath 44, the bypass air impinges against and flows around each door actuation linkage 66. This interaction with each door actuation linkage 66 may subject that door actuation linkage 66 to bypass air induced vibrations. Each door actuation linkage 66 may also be subject to vibrations in the nacelle inner structure 52 and/or the aft structure 36 and its members 46, 64. Such vibrations may be detrimental to hardware 86 (e.g., a spherical bearing, a pin connection, etc.) coupling each door actuation linkage 66 to the respective blocker door 64. Each blocker door assembly 62 of FIG. 5 therefore is configured with at least (or only) one linkage damper 88 (e.g., a snubber) for damping vibrations in the respective door actuation linkage 66.

Figure 6:
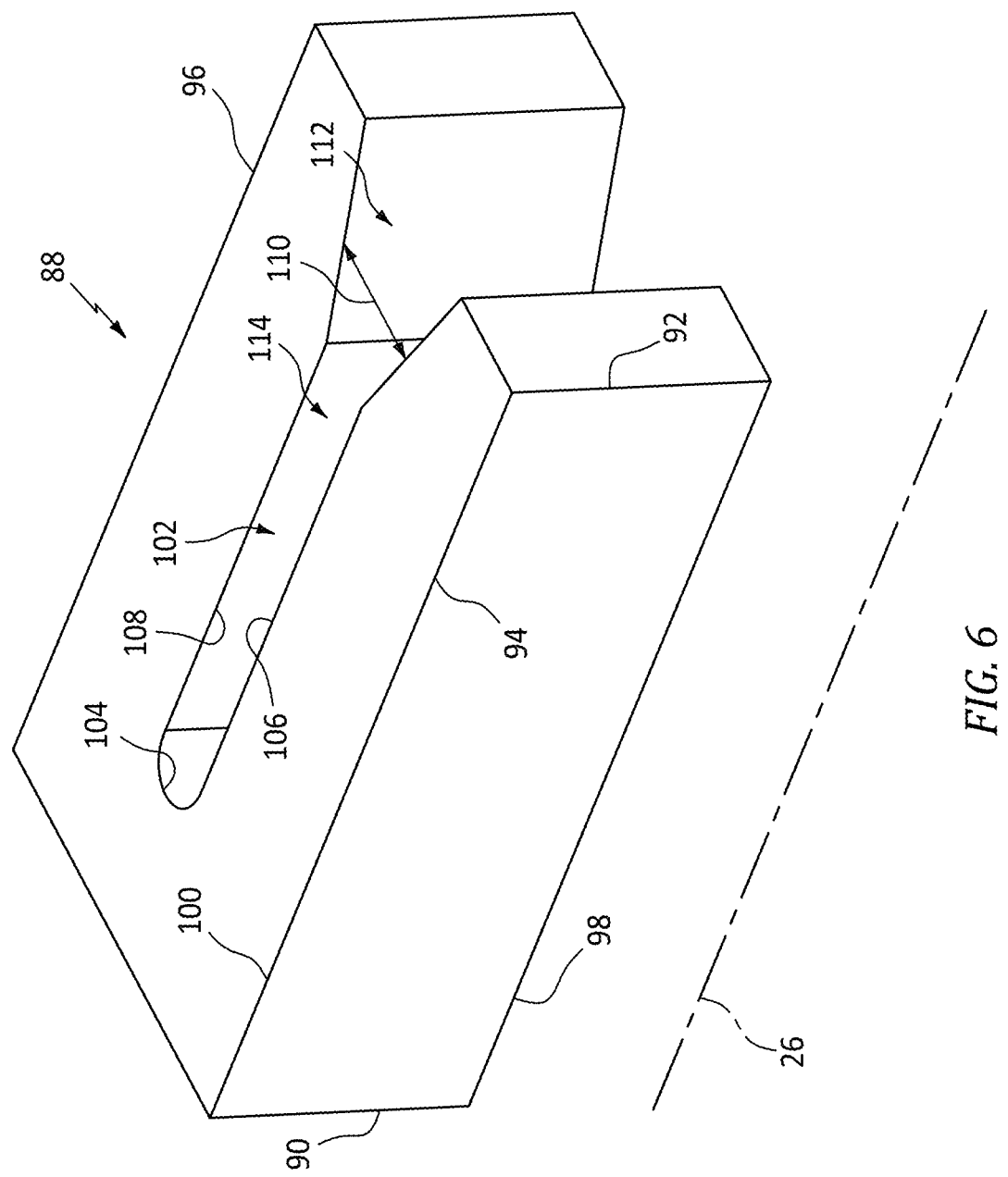
FIG. 6 is a perspective illustration of the damper.

Referring to FIG. 6, the linkage damper 88 extends axially along the axis 26 from an axial first end 90 of the linkage damper 88 to an axial second end 92 of the linkage damper 88. The damper first end 90 may be a forward, upstream end of the linkage damper 88, and the damper second end 92 may be an aft, downstream end of the linkage damper 88; e.g., with respect to flow through the bypass flowpath 44 with the thrust reverser 38 stowed (see FIG. 3). The linkage damper 88 extends laterally (e.g., circumferentially or tangentially) between and to opposing lateral first and second sides 94 and 96 of the linkage damper 88. The linkage damper 88 extends radially (relative to the axis 26) from a radial inner side 98 of the linkage damper 88 to a radial outer side 100 of the linkage damper 88.

The linkage damper 88 is configured with a linkage receptacle 102; e.g., a slot. This linkage receptacle 102 may be configured as a slot, a groove or another aperture formed within the linkage damper 88. The linkage receptacle 102 of FIG. 6, for example, projects axially into the linkage damper 88 from the damper second end 92 to an axial distal end 104 of the linkage receptacle 102. The linkage receptacle 102 extends laterally within the linkage damper 88 between and to opposing lateral first and second sides 106 and 108 of the linkage receptacle 102. The linkage receptacle 102 extends radially through (or partially into) the linkage damper 88 from the damper inner side 98 to (or towards) the damper outer side 100.

The linkage receptacle 102 may be configured with a flared end at the damper second end 92. The linkage receptacle 102 of FIG. 6, for example, has a lateral width 110 measured between the receptacle first and second sides 106 and 108. This receptacle width 110 (e.g., continuously and/or uniformly) decreases as a first portion 112 of the linkage receptacle 102 projects axially into the linkage damper 88 from the damper second end 92 to a second portion 114 of the linkage receptacle 102. The receptacle width 110 along the receptacle second portion 114, on the other hand, may be substantially or completely uniform; e.g., constant. Here, an axial length of the receptacle second portion 114 is (e.g., 1.5×, 2×, 3×) longer than an axial length of the receptacle first portion 112. The present disclosure, however, is not limited to such an exemplary linkage receptacle 102.

The linkage damper 88 may be constructed from elastomeric material. Examples of the elastomeric material include, but are not limited to, rubber, silicon, foam or composite material. In the arrangement of FIG. 6, the elastomeric material forms an entirety of the linkage damper 88 including its linkage receptacle 102. It is contemplated, however, the elastomeric material may alternatively also include a frame or a housing to provide additional support for the elastomeric material. Additionally, it is contemplated the linkage damper 88 may include a flexible covering (e.g., a cloth covering made from fiberglass or another composite material) to reduce friction and/or wear between the linkage damper 88 and the door actuation linkage 66 engaged by the linkage damper 88.

Figure 5:
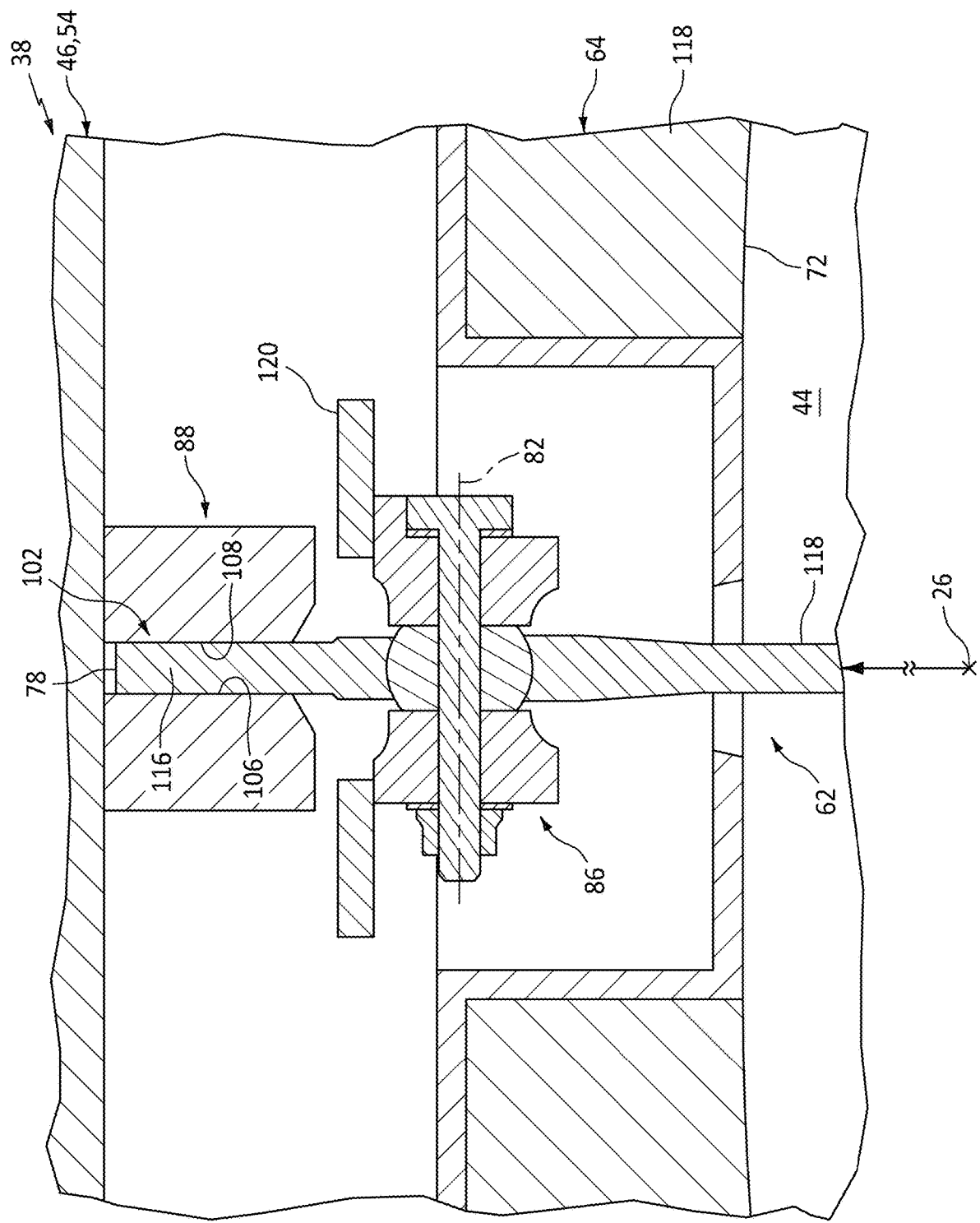
FIG. 5 is a partial cutaway illustration of the thrust reverser at an interface between a damper and a linkage.

Referring to FIG. 5, the linkage damper 88 is mounted and fixed to the translating sleeve 46. The linkage damper 88, for example, may be mechanically fastened to the translating sleeve 46 by one or more fasteners; e.g., bolts, rivets, etc. The linkage damper 88 may alternatively, or also, be bonded (e.g., adhered) and/or otherwise attached to the translating sleeve 46.

Figure 7C:
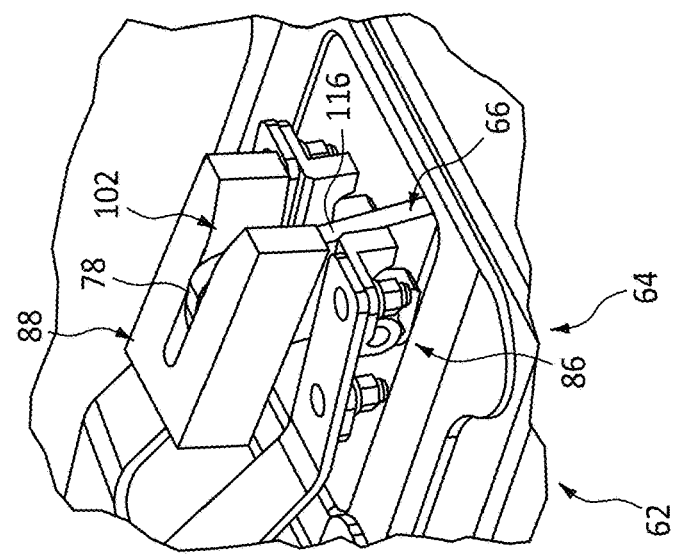
FIGS. 7A-C are partial perspective illustrations depicting mating of the linkage with the damper.
Figure 7B:
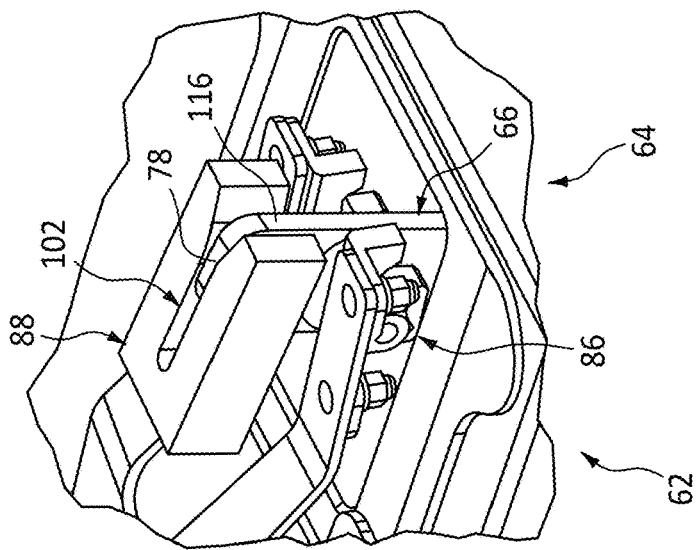
Figure 7A:
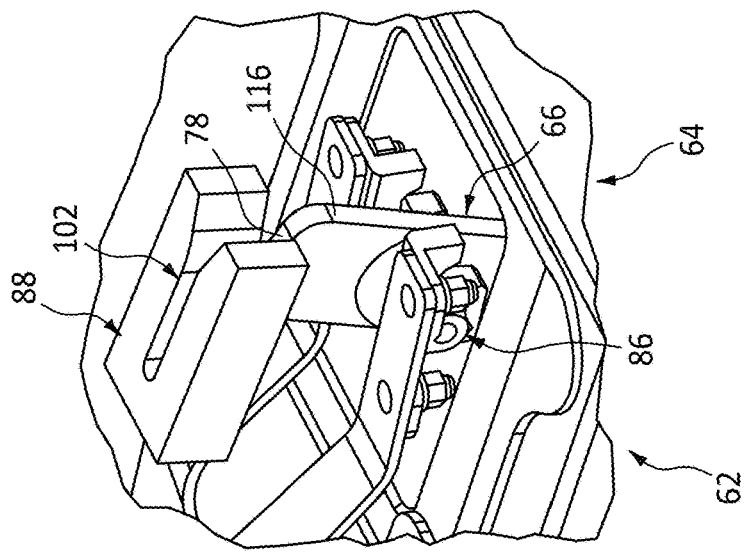

Referring to FIGS. 7A-C, as the blocker door 64 moves into its stowed position (see FIG. 7C), each door actuation linkage 66 is mated with a respective one of the linkage dampers 88. A longitudinal end portion 116 of each door actuation linkage 66 at the linkage first end 78, for example, slides into the respective linkage receptacle 102 until the linkage end portion 116 is seated within the respective linkage receptacle 102. While seated in the linkage receptacle 102, the linkage end portion 116 may laterally engage the receptacle first side 106 and/or the receptacle second side 108 (see FIG. 5). The linkage end portion 116 of FIG. 5, for example, may be (e.g., slightly) laterally squeezed within the linkage receptacle 102 between the opposing receptacle first and second sides 106 and 108. With this arrangement, the linkage end portion 116 may remain in lateral engagement (e.g., contact) with the respective linkage damper 88. The elastomeric material of the respective linkage damper 88 may thereby be operable to damp vibrations in the respective door actuation linkage 66 at least at its linkage first end 78. Here, the linkage damper 88 of FIG. 5 is disposed adjacent (e.g., slightly radially outboard of) the hardware 86 coupling the respective door actuation linkage 66 to the respective blocker door 64. The linkage damper 88 of FIG. 5 therefore is operable to reduce vibrational loads imparted onto the hardware 86 while the respective blocker door 64 is stowed.

Figure 8:
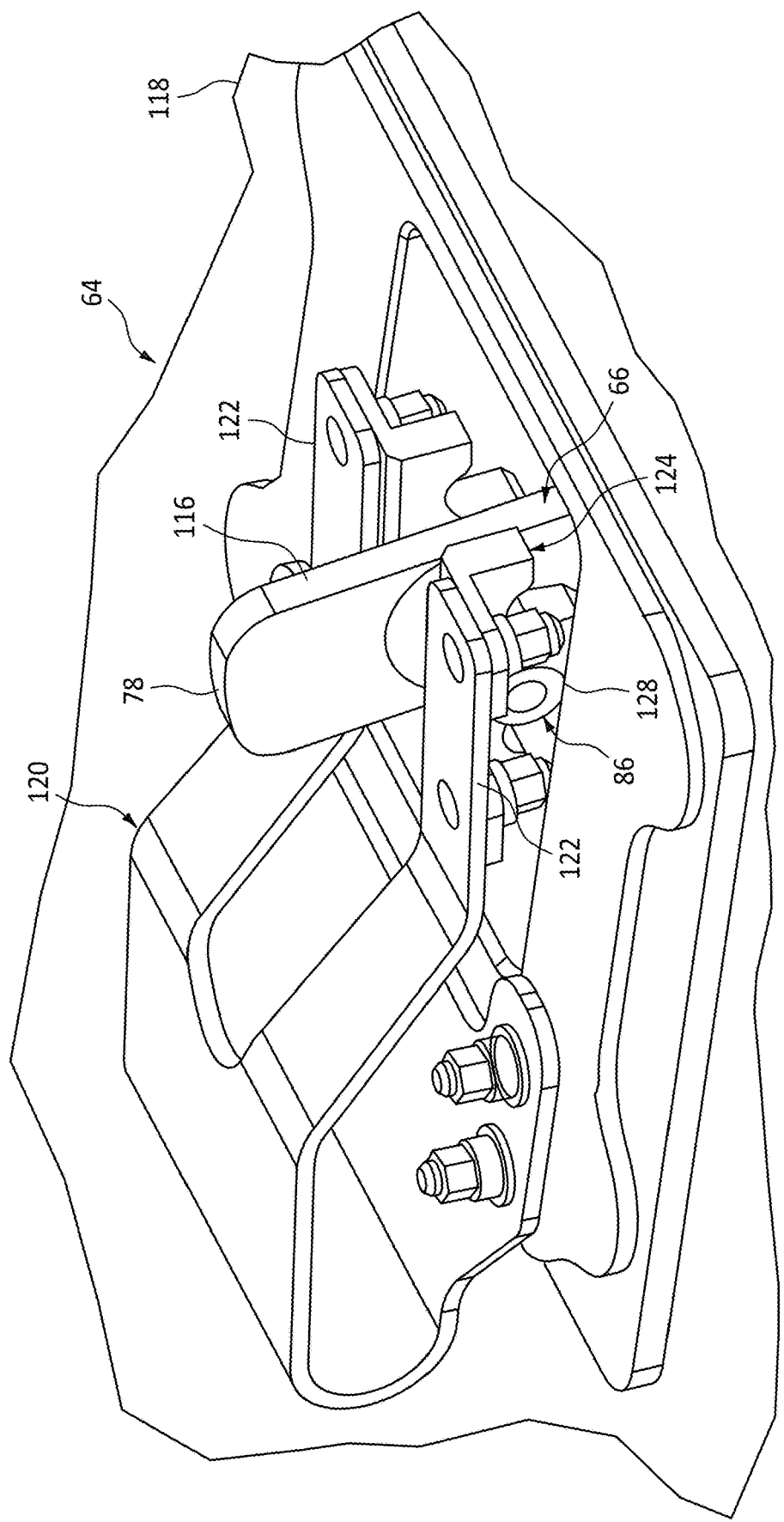
FIG. 8 is a partial perspective illustration of the linkage coupled to a panel of the blocker door by a flexible mounting device.

Referring to FIG. 8, each blocker door 64 may include a door panel 118 and a mounting device 120. Referring to FIGS. 3 and 4, the door panel 118 extends longitudinally between and to the door first end 68 and the door second end 70. The door panel 118 extends laterally between and to opposing lateral sides of the respective blocker door 64. The door panel 118 includes and forms the side surface 72. Referring again to FIG. 8, the mounting device 120 is configured to facilitate mounting the respective door actuation linkage 66 to the door panel 118. This mounting device 120 may be a flexible mounting device and/or a lost motion device. The mounting device 120 of FIG. 8, for example, includes a cantilevered spring member with one or more axially extending mounting flanges 122. The respective door actuation linkage 66 is attached to the mounting flanges 122 through the hardware 86, and disposed laterally between the mounting flanges 122.

Figure 9:
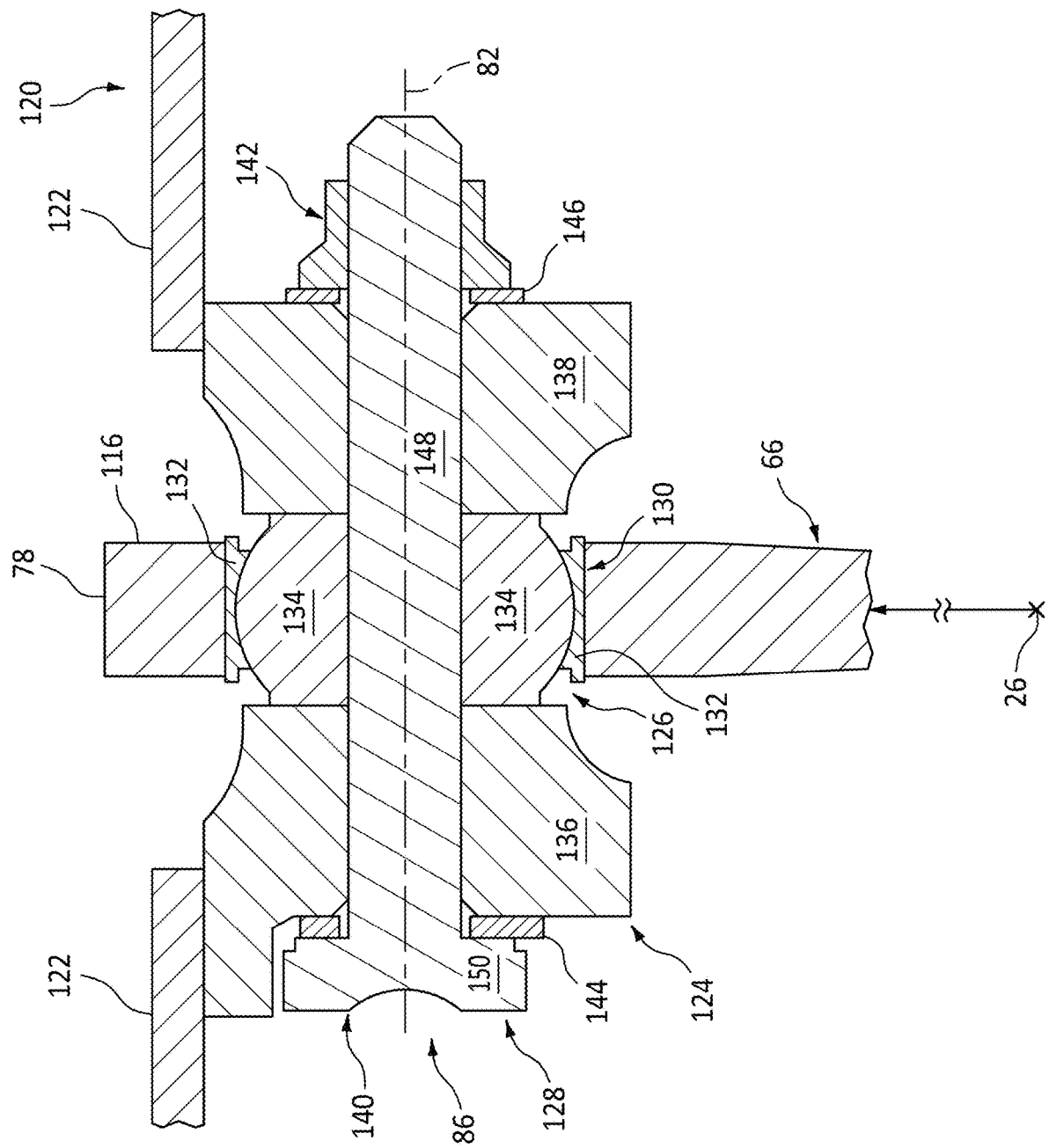
FIG. 9 is a partial sectional illustration of hardware coupling the linkage to the flexible mounting device.

Referring to FIG. 9, the hardware 86 may include a clevis mount 124, a spherical bearing 126 and a fastener assembly 128. The clevis mount 124 is fixed to the mounting device 120 and its mounting flanges 122. The clevis mount 124, for example, may be mechanically fastened to the mounting device 120 and its mounting flanges 122 by one or more fasteners; see FIG. 8.

The spherical bearing 126 of FIG. 9 is disposed within a bearing receptacle 130 (e.g., a through hole) in the respective door actuation linkage 66 at or about the linkage first end 78. The spherical bearing 126 of FIG. 9 includes an annular race element 132 and an annular ball element 134. The race element 132 is disposed within the bearing receptacle 130 and is mounted (e.g., press fit and/or otherwise attached) to the respective door actuation linkage 66. The ball element 134 is disposed within an annular channel of the race element 132, where an inner surface of the race element 132 circumscribes and radially engages (e.g., contacts) an outer surface of the ball element 134. Here, the ball element 134 is configured to move within the race element 132.

The spherical bearing 126 is disposed laterally between flanges 136 and 138 of the clevis mount 124. The spherical bearing 126 and its ball element 134 are mounted to the clevis mount 124 by the fastener assembly 128. The fastener assembly 128 of FIG. 8, for example, includes a fastener 140 (e.g., a bolt) and a nut 142. The fastener assembly 128 may also include one or more washers 144 and/or 146. A shank 148 of the fastener 140 projects axially along the respective outer pivot axis 82 through the first mount flange 136, the ball element 134 and the second mount flange 138 to a distal end of the fastener 140. A head 150 of the fastener 140 engages the first mounting flange 136, for example, through the first washer 144 or alternatively directly. The nut 142 is threaded onto the shank 148 at the distal end. The nut 142 engages the second mounting flange 138, for example, through the second washer 146 or alternatively directly. With this arrangement, the hardware members 136, 126 and 138 are captured between the head 150 and the nut 142. The present disclosure, however, is not limited to such an exemplary hardware arrangement.

In some embodiments, referring to FIG. 7C, each linkage damper 88 engages (e.g., contacts) the respective door actuation linkage 66 when the respective blocker door 64 is stowed. However, when the respective blocker door 64 is deployed, the respective door actuation linkage 66 is pulled out of the respective linkage receptacle 102. Each door actuation linkage 66 therefore may be disengaged from the respective linkage damper 88 when the respective blocker door 64 is deployed. In other embodiments, referring to FIG. 10, each blocker door assembly 62 may be configured with one or more annular linkage dampers 88' which maintain engagement with the respective door actuation linkage 66 as the blocker door 64 moves between its stowed position and its deployed position (see FIGS. 3 and 4). Note, while the linkage dampers 88' are shown in FIG. 10 as an alternative to inclusion of the linkage damper 88 of FIG. 7C, it is contemplated each blocker door assembly 62 may alternatively be configured with both types of linkage dampers 88 and 88'.

Figure 10:
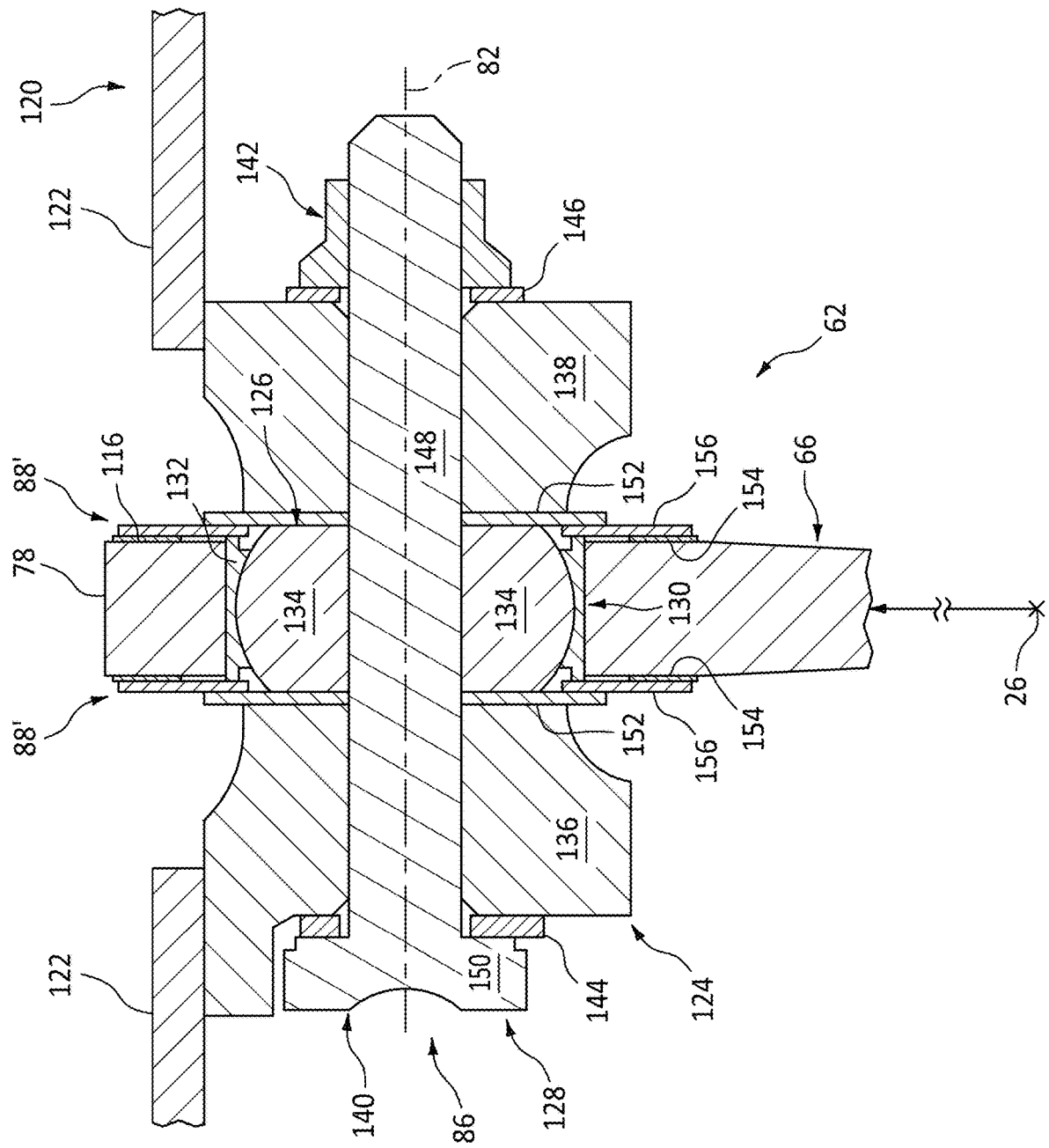
FIG. 10 is a partial sectional illustration of the thrust reverser with one or more annular dampers.

Each linkage damper 88' of FIG. 10 includes an inner ring 152, an outer ring 154 and an intermediate ring 156. Each of these damper members 152, 154, 156 may have an annular (e.g., washer like) body, and extend circumferentially around the respective outer pivot axis 82 and the associated fastener 140. The inner ring 152 and the outer ring 154 are each stiff bodies; e.g., each ring 152, 154 may be a metal washer. The intermediate ring 156 is a flexible, resilient body; e.g., the intermediate ring 156 may be constructed from or otherwise include the elastomeric material. The intermediate ring 156 is disposed laterally (relative to the axis 26)/axially (relative to the respective outer pivot axis 82) between the inner ring 152 and the outer ring 154. The intermediate ring 156 is bonded and/or otherwise attached to the inner ring 152 and the outer ring 154 such that the intermediate ring 156 connects the inner ring 152 to the outer ring 154 and vice versa. Here, an inner radius of the outer ring 154 is sized larger than an outer radius of the inner ring 152, where the intermediate ring 156 bridges a radial gap between the inner ring 152 and the outer ring 154.

The inner ring 152 may be clamped between a respective one of the clevis flanges 136, 138 and the ball element 134. The outer ring 154 may be abutted and pressed against the respective door actuation linkage 66. The intermediate ring 156 thereby engages the clevis mount 124 and its respective clevis flange 136, 138 through the inner ring 152. The intermediate ring 156 engages the respective door actuation linkage 66 through the outer ring 154. With this arrangement, the intermediate ring 156 is configured to resist (e.g., slight) movement between the inner ring 152 and the outer ring 154. The linkage damper 88' and its intermediate ring 156 may thereby be operable to damp vibrations in the respective door actuation linkage 66 at least at its linkage first end 78.

While the linkage dampers 88' of FIG. 10 are described above with respect to use in the blocker door assemblies 62, the present disclosure is not limited thereto. One or more of the linkage dampers 88', for example, may alternatively be arranged with any other linkage/link of an aircraft which may be subject to vibrations. For example, one or more of the linkage dampers 88' may be arranged with an end of a linear actuator; e.g., a piston, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
a thrust reverser including a passage, a blocker door, an actuation linkage and a damper, the thrust reverser configured to move the blocker door from a stowed position to a deployed position using the actuation linkage;
the blocker door located radially outboard of a flowpath relative to an axis when the blocker door is in the stowed position, and the blocker door configured to redirect air flowing in the flowpath radially outward through the passage when the blocker door is in the deployed position;
the actuation linkage pivotally coupled to the blocker door at a longitudinal distal end of the actuation linkage; and
the damper disposed at the longitudinal distal end of the actuation linkage, the damper configured to engage the actuation linkage and damp vibrations in the actuation linkage, the damper comprising elastomeric material, wherein the damper is configured to engage the actuation linkage and damp the vibrations in the actuation linkage when the blocker door is in the stowed position, and the damper is disengaged from the actuation linkage when the blocker door is in the deployed position.

2. The apparatus of claim 1, wherein the elastomeric material contacts the actuation linkage.

3. The apparatus of claim 1, wherein
the actuation linkage extends laterally between opposing linkage sides at the longitudinal distal end of the actuation linkage; and
the damper is configured to laterally engage a first of the opposing linkage sides at least when the blocker door is in the stowed position.

4. The apparatus of claim 3, wherein the damper is further configured to laterally engage a second of the opposing linkage sides at least when the blocker door is in the stowed position.

5. The apparatus of claim 1, wherein the actuation linkage is configured to move into a slot in the damper as the blocker door moves into the stowed position.

6. The apparatus of claim 1, further comprising:
a stationary structure;
a second longitudinal distal end of the actuation linkage pivotally coupled to the stationary structure.

7. The apparatus of claim 6, wherein the stationary structure is radially inboard of the flowpath relative to the axis.

8. The apparatus of claim 1, wherein the actuation linkage is configured as a single link.

9. The apparatus of claim 1, wherein the actuation linkage extends radially inward from the longitudinal distal end of the actuation linkage across the flowpath when the blocker door is in the stowed position.

10. An apparatus for an aircraft propulsion system, comprising:

a thrust reverser including a passage, a blocker door, an actuation linkage and a damper, the thrust reverser configured to move the blocker door from a stowed position to a deployed position using the actuation linkage;

the blocker door located radially outboard of a flowpath relative to an axis when the blocker door is in the stowed position, and the blocker door configured to redirect air flowing in the flowpath radially outward through the passage when the blocker door is in the deployed position;

the actuation linkage pivotally coupled to the blocker door at a longitudinal distal end of the actuation linkage; and the damper disposed at the longitudinal distal end of the actuation linkage, the damper configured to engage the actuation linkage and damp vibrations in the actuation linkage, and the damper comprising elastomeric material;

wherein the thrust reverser further comprises a translating sleeve configured translate along the axis;

wherein the blocker door is pivotally coupled to the translating sleeve; and wherein the damper is fixed to the translating sleeve.

11. An apparatus for an aircraft propulsion system, comprising:

a thrust reverser including a passage, a blocker door, an actuation linkage and a damper, the thrust reverser configured to move the blocker door from a stowed position to a deployed position using the actuation linkage;

the blocker door located radially outboard of a flowpath relative to an axis when the blocker door is in the stowed position, and the blocker door configured to redirect air flowing in the flowpath radially outward through the passage when the blocker door is in the deployed position;

the actuation linkage pivotally coupled to the blocker door at a longitudinal distal end of the actuation linkage; and the damper disposed at the longitudinal distal end of the actuation linkage, the damper configured to engage the actuation linkage and damp vibrations in the actuation linkage, and the damper comprising elastomeric material;

wherein the blocker door comprises a door panel and a flexible mounting device fixed to the door panel, the flexible mounting device discrete from the damper; and wherein the actuation linkage pivotally coupled to the flexible mounting device at the longitudinal distal end of the actuation linkage.

12. An apparatus for an aircraft propulsion system, comprising:

a thrust reverser including a passage, a blocker door, an actuation linkage and a damper, the thrust reverser configured to move the blocker door from a stowed position to a deployed position using the actuation linkage;

the blocker door located radially outboard of a flowpath relative to an axis when the blocker door is in the stowed position, and the blocker door configured to redirect air flowing in the flowpath radially outward through the passage when the blocker door is in the deployed position;

the actuation linkage pivotally coupled to the blocker door at a longitudinal distal end of the actuation linkage; and the damper disposed at the longitudinal distal end of the actuation linkage, the damper configured to engage the actuation linkage and damp vibrations in the actuation linkage, the damper comprising elastomeric material;

wherein the actuation linkage is pivotally coupled to the blocker door at a pivot axis, and the damper circumscribes the pivot axis;

wherein the actuation linkage is pivotally coupled to the blocker door through a spherical bearing;

wherein the damper further comprises a stiff inner body, a stiff outer body and a flexible intermediate body comprising the elastomeric material;

wherein the stiff inner body abutted against the spherical bearing;

wherein the stiff outer body abutted against the actuation linkage; and wherein the flexible intermediate connecting the stiff inner body to the stiff outer body.

13. The apparatus of claim 12, wherein at least one of the stiff inner body is a metal inner washer; or the stiff outer body is a metal outer washer.

* * * * *